United States Patent [19]

Osawa et al.

[11] Patent Number: 5,710,826
[45] Date of Patent: Jan. 20, 1998

[54] IMAGE ENCODING METHOD

[75] Inventors: Hidefumi Osawa, Kawaguchi; Yasuhiko Yasuda, Musashino; Shigeo Kato, Saitama-ken, all of Japan

[73] Assignee: Canon Kabushiki Kaisha, Tokyo, Japan

[21] Appl. No.: 190,470

[22] Filed: Feb. 2, 1994

Related U.S. Application Data

[62] Division of Ser. No. 982,115, Nov. 25, 1992, Pat. No. 5,317,428, which is a continuation of Ser. No. 514,766, Apr. 26, 1990, abandoned.

[30] Foreign Application Priority Data

| Apr. 26, 1989 | [JP] | Japan | 1-106608 |
| Apr. 26, 1989 | [JP] | Japan | 1-106609 |

[51] Int. Cl.$^6$ .............................. G06T 9/00
[52] U.S. Cl. .............. 382/166; 382/238; 358/539; 358/430
[58] Field of Search .................... 382/56, 166, 238; 358/261.2, 427, 430, 539, 538; 348/409, 415

[56] References Cited

U.S. PATENT DOCUMENTS

| 4,325,085 | 4/1982 | Gooch | 358/261.2 |
| 4,613,948 | 9/1986 | Gharavi | 358/430 |
| 4,656,500 | 4/1987 | Mori | 358/430 |
| 4,682,869 | 7/1987 | Itoh et al. | 358/261.1 |
| 4,739,397 | 4/1988 | Hayashi | 358/501 |
| 4,821,208 | 4/1989 | Ryan et al. | 345/155 |
| 4,887,224 | 12/1989 | Okano et al. | 358/426 |
| 5,122,872 | 6/1992 | Nagano | 358/521 |
| 5,124,811 | 6/1992 | Ohsawa et al. | 358/448 |
| 5,136,396 | 8/1992 | Kato et al. | 358/426 |
| 5,321,517 | 6/1994 | Takei et al. | 348/688 |

FOREIGN PATENT DOCUMENTS

| 0284281 | 9/1988 | European Pat. Off. | H04N 1/417 |
| 2154826 | 9/1985 | United Kingdom | H04N 1/46 |

OTHER PUBLICATIONS

"Compression of Block-White Images With Arithmetic Coding", Langdon et al., IEEE Trans. Comm. vol. COM-29, No. 6, Jun. 1981.

*Primary Examiner*—Joseph Mancuso
*Assistant Examiner*—Jon Chang
*Attorney, Agent, or Firm*—Fitzpatrick, Cella, Harper & Scinto

[57] ABSTRACT

There is provided an image encoding method in a facsimile apparatus or an image filing apparatus as an image communication apparatus. In this method, a color image signal which is expressed by a plurality of color component signals to be encoded is input, the input color image signal is converted into a bit stream signal, and the bit stream signal is encoded by prediction encoding. A parameter for the prediction encoding is changed in accordance with the color image signal to be encoded. The encoding operation is executed adaptively to the color image signal to be encoded. By virtue of bit stream converting the binary color signal, efficient encoding using the color correlation can be executed and an increase in data amount is prevented. By encoding the bit stream signal using a dynamic arithmetic code, a binary color image can be efficiently encoded.

13 Claims, 13 Drawing Sheets

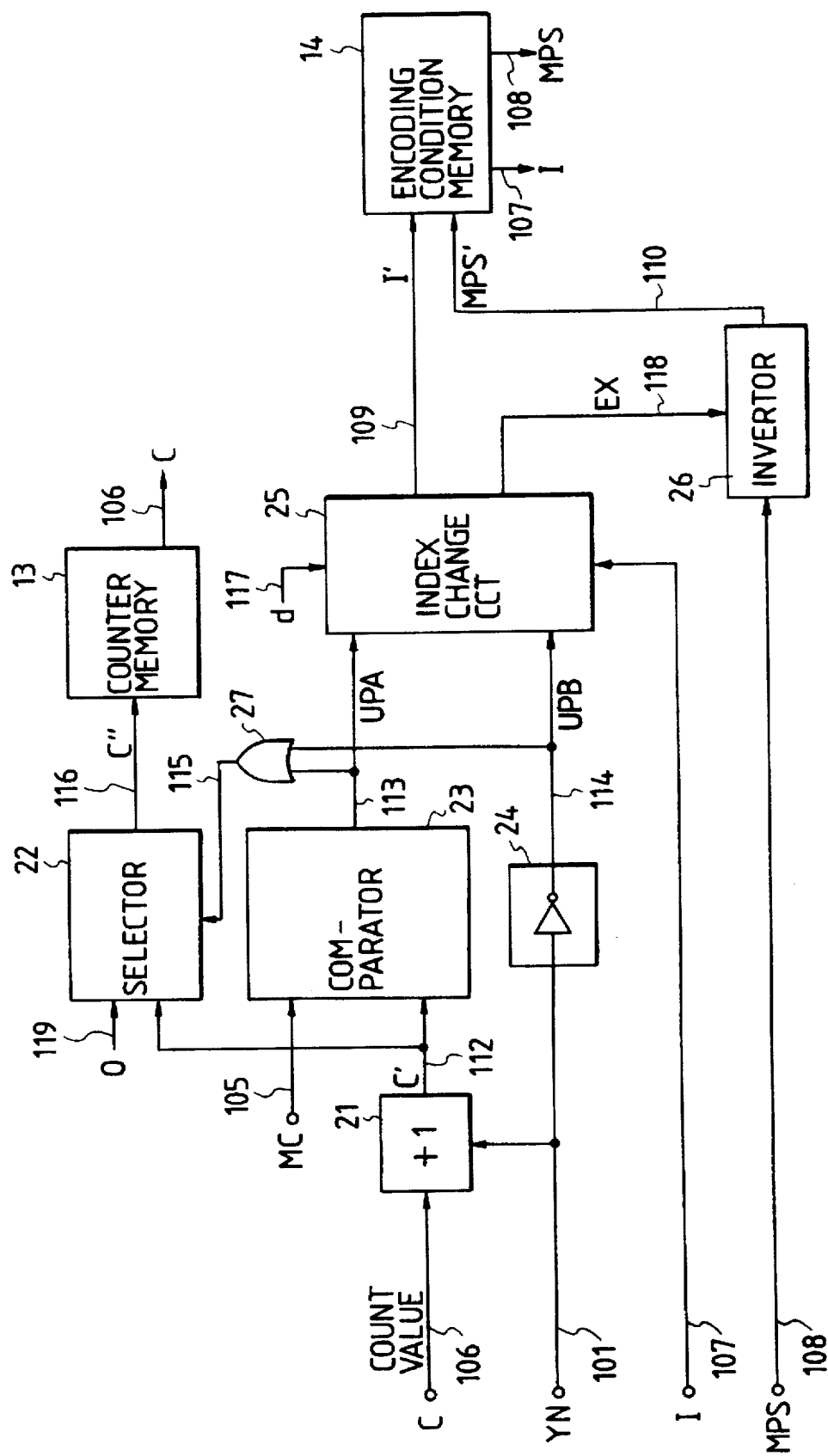

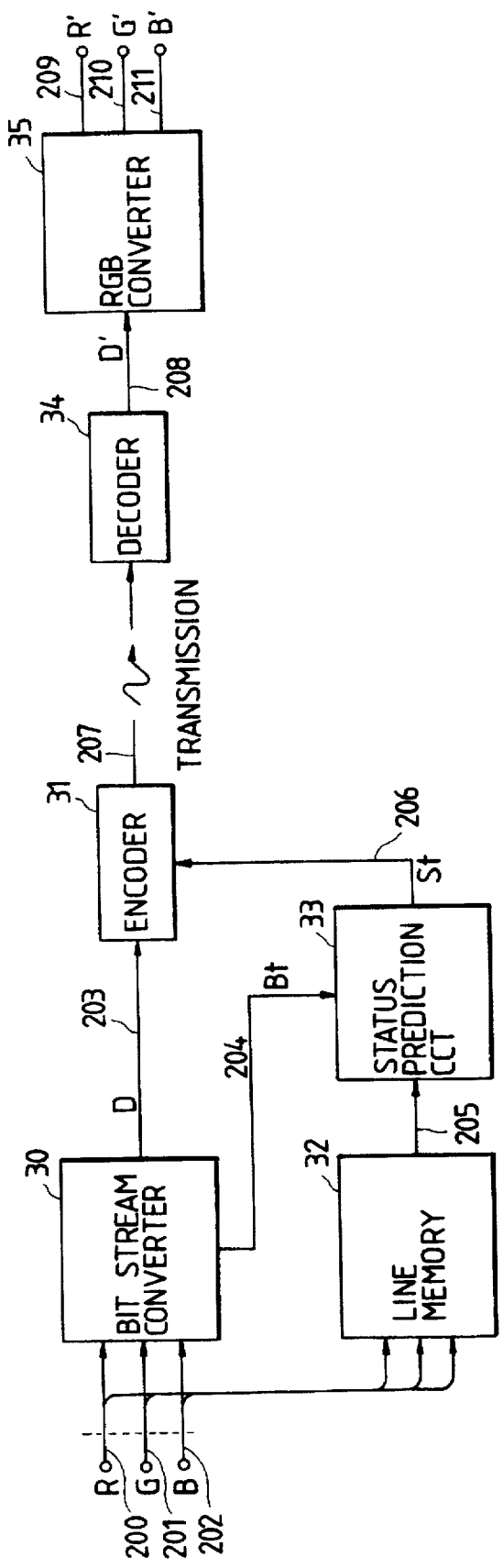
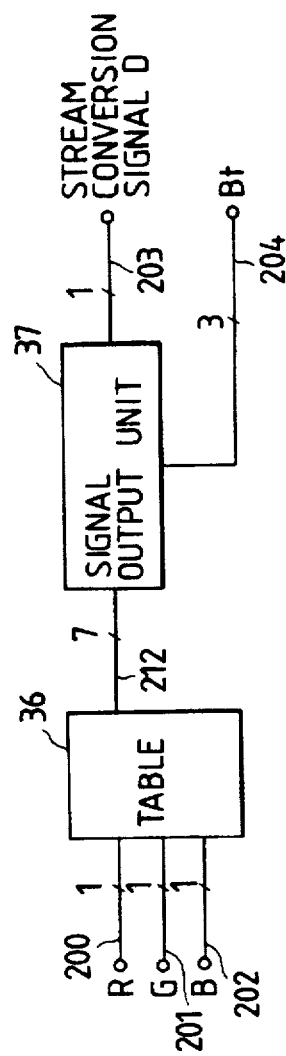
FIG. 9
FIG. 10

IMAGE ENCODING METHOD

This application is division of application Ser. No. 79/982,115 filed Nov. 25, 1992, U.S. Pat. No. 5,317,428, which was a continuation of application Ser. No. 07/514,766 filed Apr. 26, 1990, now abandoned.

BACKGROUND OF THE INVENTION

1. Field of the Invention

The present invention relates to an image encoding system in a facsimile apparatus or an image filing apparatus as an image communication apparatus.

2. Related Background Art

As a conventional image encoding system, a run length encoding system represented by the G3 or G4 facsimile which is recommended by CCITT (international Telegraph and Telephone Consultative Committee) is generally used. According to such an encoding system, a length (run length) in which all white pixels or all black pixels continue is counted and a code corresponding to its count value is determined from a prepared code table. The code table which is used in such a system is characterized by the feature that a relatively short code is assigned to a long white run which is frequently seen in a document image. Therefore, in the case where the statistical characteristics of the run length differ from those of the image which was used as a reference in the making of the code table, for instance, in the case of encoding a pseudo half tone image in which white and black pixels frequently alternate, there is a problem that such an amount of information required to express the codes exceeds the amount of original data.

Therefore, as an encoding method in which encoding can be also efficiently executed even for above-described image such that an inconvenience occurs with encoding based as described above on run length, an encoding method whereby a Markovian model code such as an arithmetic code or the like is used has been proposed.

The conventional well-known arithmetic code is based on a method whereby a code is formed by an arithmetic operation so that an input signal train is set to a code which is expressed by a decimal fraction. The above method has been published by the literature by Langdon, Rissanen, et al., "Compression of Black/White Images with Arithmetic Coding," IEEE Transaction Com., COM-29, 6, Jun. 1981, and the like. According to the literature, assuming that an input signal train which has already been encoded is set to S, a probability with which a less probable symbol (LPS) appears is set to q, an augend of the arithmetic register is set to A(S), and a code register is set to C(S), the following arithmetic operations are executed for every input signal.

$$A(S_1) = A(S) \times q \approx A(S) \times 2^{-Q} \quad (1)$$

$$A(S_0) = <A(S) - A(S_1)>_l \quad (2)$$

<>denotes the cutting at an effective number of digits, i.e. l bits.

$$C(S_0) = C(S) \quad (3)$$

$$C(S_1) = C(S) + A(S_0) \quad (4)$$

In the case where the encoding data is a most probable symbol (MPS: 0 in the above example), $A(S_0)$ and $C(S_0)$ are used to encode the next data. On the other hand, if the encoding data is a less probable symbol (LPS: 1 in the above example), $A(S_1)$ and $C(S_1)$ are used to encode the next data.

The new value of A is increased by $2^S$ times (S is an integer equal to 0 or more) and is set to a value within a range of $0.5 \leq A < 1.0$. The above process corresponds to the content of the arithmetic register A being shifted S times in the hardware. The code register C is also shifted to the left the same number of times and the signal which was shifted out is set to a code. By repeating the above processes, the codes are formed.

On the other hand, as shown by equation (1), by approximating the appearance probability q of the LPS by the power of 2 ($2^{-Q}$: Q is a positive integer), multiplication is replaced by a shift arithmetic operation. To further improve such an approximation, there has been proposed a method whereby q is approximated by, for instance, a polynomial in powers of 2 as shown by equation (5). The worst efficiency point is improved by the above approximation.

$$q \approx 2^{-Q_1} + 2^{-Q_2} \quad (5)$$

However, in the above arithmetic encoding, the appearance probability which was approximated by the powers of 2 is fixed and it may happen that the encoding is not efficiently executed for an image of different appearance probability.

Therefore, there has been proposed a method whereby the appearance probability q of the LPS is changed in accordance with the features of the image to be encoded and efficient encoding suitable to an image is performed. As such a probability estimating method, there have been known a static method of unconditionally deciding a probability in accordance with the status of a pixel which has already been encoded and a dynamic method of estimating the probability while encoding.

In the case where the appearance probability q of the LPS was approximated by the polynomial in powers of 2, the value of the appearance probability q is a discontinuous value. A condition, a timing, and the like to change a certain appearance probability to another appearance probability are large factors in accomplishing the optimum encoding.

On the other hand, as mentioned above, in a facsimile apparatus as a typical example of a conventional image communication apparatus, an MH code, an MR code, or the like is used as a system for encoding black/white binary data. On the other hand, in recent years, the development of a cheap color printer has progressed and there has been proposed image communication of a color image, particularly, a binary color image having data of red (R), green (G), and blue (B) each consisting of one bit or data of yellow (Y), cyan (C), and magenta (M) each consisting of one bit.

As such an encoding system of a binary color image, there has been considered a method whereby three colors are encoded for every bit plane and the MH or MR coding system for black/white data is used.

However, according to the method of encoding three colors for every bit plane, there is the problem that by encoding three colors for every bit plane of R, G, and B, the entropies of the original RGB information sources are increased, so that the encoding efficiency is deteriorated. This typically results in the color correlation information not being used.

SUMMARY OF THE INVENTION

The present invention is made in consideration of the above problems and it is an object of the invention to provide an image encoding method which can accomplish the efficient image encoding.

Another object of the invention is to provide an image encoding method for efficiently encoding a color image signal by using the color correlation.

Still another object of the invention is to provide an image encoding method for adaptively encoding an image to be encoded.

Further another object of the invention is to provide an image encoding method which can also preferably encode both of a color image and a black and white image.

The above and other objects and features of the present invention will become apparent from the following detailed description and the appended claims with reference to the accompanying drawings.

BRIEF DESCRIPTION OF THE DRAWINGS

FIG. 3 is a block diagram of a renewal circuit;

FIG. 9 is a block diagram of a transmission system of a color image;

FIG. 10 is a block diagram of a bit stream converter circuit;

DETAILED DESCRIPTION OF THE PREFERRED EMBODIMENT

Figure 1:
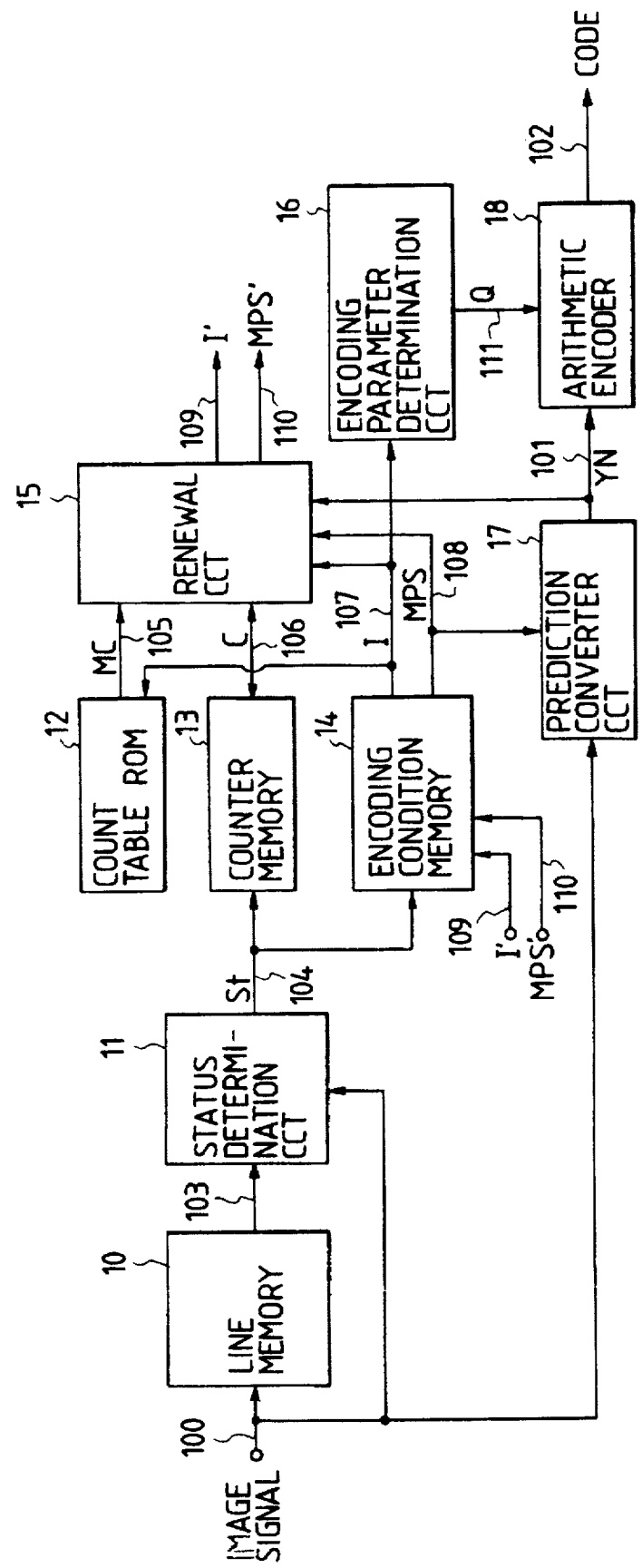
FIG. 1 is a block diagram of an encoder to which the present invention is applied.

FIG. 1 is a diagram showing an embodiment of an encoding apparatus to which the present invention is applied. An image signal 100 in the form of binary data bits (0 or 1; white or black) is input to a line memory 10 and the data of a few lines is held. By inputting an output signal 103 from the line memory 10 to a status determination circuit 11, the status (i.e., the particular bit pattern) to which an objective pixel in the image signal 100 belongs is determined. The total number of possible statuses is determined by the number of peripheral pixels of the objective pixel which are referred to. Assuming that the number of reference pixels is set to n, the total number of possible statuses is equal to $2^n$. A status signal St 104 indicative of the decided status is input to a counter memory 13 and an encoding condition memory 14.

A most probable symbol MPS 108 as a symbol which is likely to appear and an index I 107 indicative of an encoding condition of an arithmetic code, which will be explained hereinlater, are stored in the encoding condition memory 14 for every status which is indicated by the status signal St 104. The MPS 108 is input to a prediction converter circuit 17. The prediction converter circuit 17 outputs a YN signal 101 which is set to "1" when the image signal 100 coincides with the MPS 108. The YN signal 101 is input to a renewal circuit 15. When the YN signal is set to "1", in the renewal circuit 15 increases by "1" a count value of the corresponding status among count values stored in the counter memory 13. When a count value C 106 stored in the counter memory 13 coincides with a set value MC 105 from a count table ROM 12, the index I 107 is updated in such a direction that it is increased (the direction to reduce the appearance probability q of the LPS).

The set number MC 105 of the MPSs shown in Table 1 which has been predetermined in correspondence to the index I indicative of the appearance probability q of the LPS is supplied from the count table ROM 12 to the renewal circuit 15.

In the renewal circuit 15, when the MPS 108 differs from the pixel signal 100, that is, when the YN signal from the prediction converter circuit 17 is set to "0", the index I 107 is updated in such a direction as to reduce the index (the direction so as to increase the appearance probability q of the LPS). On the other hand, if the YN signal of "0" is input when the index is set to "1", the MPS is inverted (0→1 or 1→0). An output I' 109 and an MPS' 110 denote values of the index after it is updated. Those values are again stored into the encoding condition memory 14.

An encoding parameter determination circuit 16 sets an encoding parameter Q 111 of an arithmetic code into an arithmetic encoder 18 on the basis of the value of the index I 107. In the arithmetic encoder 18, the YN signal 101 from the prediction converter circuit 17 is arithmetically encoded by using the parameter Q 111, thereby obtaining a code 102.

Figure 2:
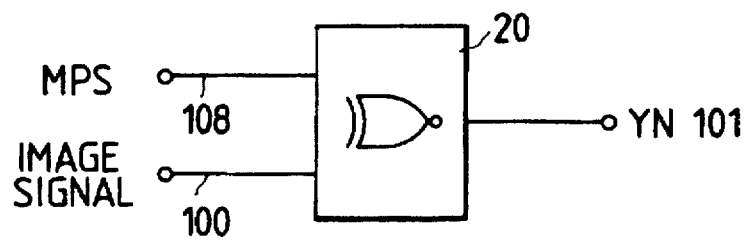
FIG. 2 is a block diagram of a prediction converter circuit.

FIG. 2 is a block diagram of the prediction converter circuit 17. The image signal 100 and the MPS 108 are input to an EX-NOR circuit 20. In accordance with a logic equation of Table 2, the EX-NOR circuit 20 outputs the YN signal 101 which is set to "1" when the image signal 100 and MPS 108 coincide and which is set to "0" when they differ.

FIG. 3 is a block diagram of the renewal circuit 15. When the YN signal 101 is set to "1", the count value C 106 from the counter memory 13 is increased by "1" by an adder 21 and a signal C' 112 is derived. The updated count value is compared with the set value MC 105 from the count table ROM 12 by a comparator 23. When the value of C' coincides with the value of MC, an updating signal UPA 113 is set to "1". On the other hand, the YN signal 101 is transmitted through an invertor 24 and becomes an updating signal UPB 114. The updating signals UPA and UPB are input to an index change circuit 25. The OR of the UPA and UPB is calculated by an OR circuit 27. An output signal 115 of the OR circuit 27 is input as a switching signal to a selector 22. When the signal 115 is set to "1", the selector 22 selects a "0" signal 119 to reset the value of the counter. When the signal 115 is set to "0", the selector 22 selects the output signal C' 112 of the adder 21 and outputs as a counter updating signal C" 116 and stores into the counter memory 13.

A signal d 117 (which has a standard value, d=1) to control the updating dividing level of the index, the updating signals UPA 113 and UPB 114, and the present index I 107 from the encoding condition memory 14 are input to the index change circuit 25.

Table 3 indicates index updating methods in the index change circuit 25 (Table 3 shows the cases where the updating dividing level is set such that d=1 and d=2). An updated index I' is determined by referring to the table with respect to the input I, condition d, UPA, and UPB. On the other hand, when I=1 and UPB=1, an EX signal 118 is set to "1". When the EX signal is set to "1", an invertor 26 inverts the symbol of the present MPS 108 (0→1 or 1→0) and obtains the updated MPS' 110. On the other hand, when EX=0, the MPS' is not changed. The updated I' 109 and MPS' 110 are stored into the encoding condition memory 14 and are used as the index I and MPS for the next processings. The updating methods shown in Table 3 can be also constructed by a table by using an ROM or the like or can be also constructed by a logical circuit by using adders and subtracters.

As mentioned above, when the MPSs of the number which has been predetermined in accordance with the value of the index I indicative of the appearance probability q of the LPS which was approximated by the polynomial in powers of 2 occurred as mentioned above, the index I has d added thereto, thereby reducing the appearance probability q of the LPS which is used for the arithmetic code. On the other hand, when the LPSs occurred, the index I has d subtracted therefrom, thereby increasing the appearance probability q of the LPS which is used for the arithmetic code. On the other hand, when the LPS occurred in the state when the index I in which the appearance probability q of the LPS indicates 0.5 is set to "1", the MPS is inverted.

As mentioned above, by updating the index and MPS so as to be adaptive to the input image, arithmetic encoding of a high encoding efficiency can be accomplished.

Figure 4:
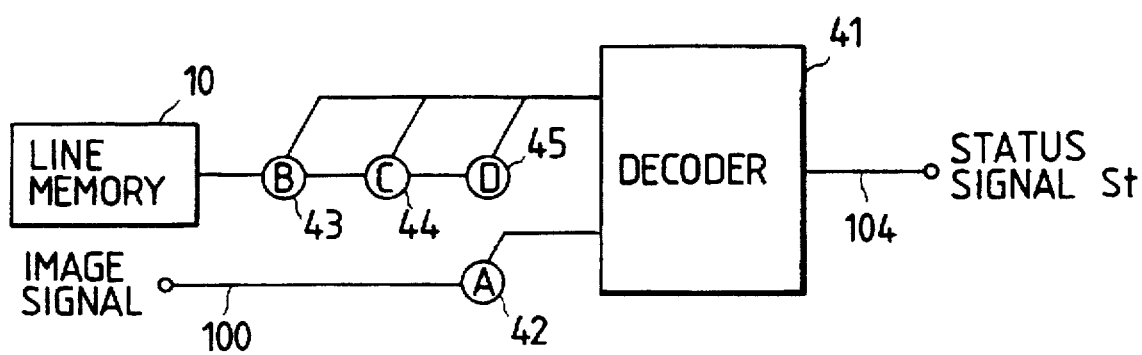
FIG. 4 is a block diagram of a status determination circuit.
Figure 5:
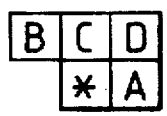
FIG. 5 is a diagram showing reference pixels.

FIG. 4 is a block diagram of the status determination circuit 11. Four pixels A, B, C, and D shown in FIG. 5 are used as reference pixels to determine the status. * represents a position of the objective pixel to be encoded. In FIG. 4, reference numerals 42, 43, 44, and 45 denote latches. The A latch 42 holds the data of the preceding pixel of the image signal 100 of the objective pixel *. As shown in FIG. 5, the B latch 43 holds the data at the position which is one-pixel preceding the present objective pixel position of one line before. The C latch 44 holds the data at the present objective pixel position of one line before. The D latch 45 holds the data at the position which is one-pixel after the present objective pixel position of one line before. The latched data of those latches are input to a decoder 41. An output from the decoder 41 is used as the status signal St 104 (0 to 15) indicative of sixteen statuses. The number of reference pixels is not limited to four.

Figure 6:
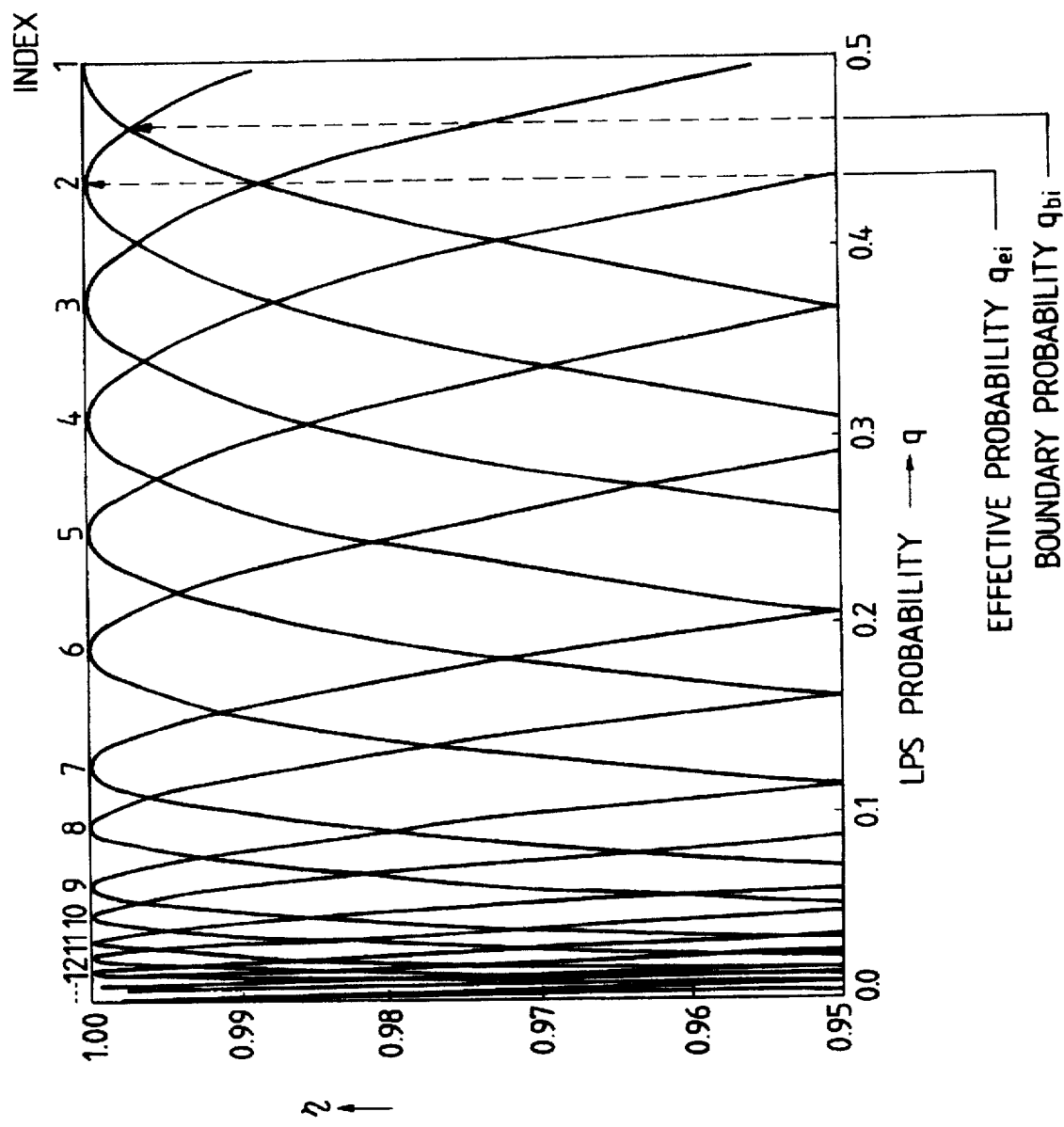
FIG. 6 is a diagram showing encoding efficiency curves.

FIG. 6 shows encoding efficiency curves of arithmetic codes which are used in the embodiment. The value of the index I is shown by a small letter i. The curves are shown by equation (6) when the appearance probability of the LPS is set to q and the approximation probability upon encoding is set to $q_{ei}$. The index I is sequentially set to 1, 2, 3, ... in the direction from the large value of the appearance probability q of the LPS to the small value.

$$\eta = \frac{-q\log_2 q - (1-q)\log_2(1-q)}{-q\log_2 q_{ei} - (1-q)\log_2(1-q_{ei})} \quad (6)$$

The numerator indicates an entropy and $q_{ei}$ is set to a value shown by equation (7).

$$q_{ei} = q_1 q_2 \quad (7)$$

$q_1$ and $q_2$ are set to the values which are approximated by the polynomial in powers of 2 and are given by Table 4. The values of $q_1$ and $q_2$ are shown by, for instance, equations (8) to (10).

$$q_{e1} = 2^{-2} + 2^{-2} \quad (8)$$

$$q_{e2} = 2^{-1} - 2^{-4} \quad (9)$$

$$q_{e3} = 2^{-2} + 2^{-3} \quad (10)$$

$q_{ei}$ at the peak point when an efficiency n is set to 1.0 in the above probability is hereinafter called an effective probability. On the other hand, an intersection of the efficiency curve is called a boundary probability $q_{bi}$. It will be obviously understood that the efficiency is improved by encoding by using the adjacent effective probabilities around the boundary probability as a turning point.

In the embodiment, as shown in equation (5), the effective probability $q_{ei}$ shown in Table 4 is selected from the probabilities which can be approximated by two terms. On the other hand, $Q_1$, $Q_2$, and $Q_3$ in Table 4 denote parameters $Q_c$ 111 which are sent to the arithmetic encoder 18. That is, $Q_1$ and $Q_2$ indicate shift amounts which are given to shift registers. The calculation of the power of 2 is executed by the shift arithmetic operations. $Q_3$ shows a coefficient of the second term and is used to switch between (+) and (−).

The value of MC in Table 1 is determined in the following manner.

That is, assuming that the number of LPSs is set to $N_L$ and the number of MPSs is set to $N_M$, the appearance probability of the LPS is given by equation (11).

$$q = \frac{N_L}{N_M + N_L} \quad (11)$$

Equation (12) is obtained by solving equation (11) by $N_M$.

$$N_M = \lfloor N_L(1/q - 1) \rfloor \quad (12)$$

where, $\lfloor x \rfloor$ denotes t-at the figures below a decimal point are raised to a unit. By giving the boundary probability $q_{bi}$ shown in FIG. 6 to q in equation (12) the number $N_{Mi}$ of most probable symbols (MPSs) which occurred there is calculated. Therefore, MC is calculated by equation (13).

$$MC_i = N_{Mi+1} - N_{Mi} \quad (13)$$

The values of MC in Table 1 are obtained by the calculations on the basis of equations (11), (12), and (13) on the assumption that $N_L = 2$.

As mentioned above, as shown in FIG. 6, the number $N_{Mi}$ of MPSs corresponding to each index I is obtained on the basis of each boundary probability $q_{bi}$ and the difference between the numbers $N_M$ of MPSs of the adjacent indices is set to the value of MC for each index I.

The value of MC is compared with the number of MPSs which occur as mentioned above. When the value of MC coincides with the number of MPSs, the status in this case is determined to be the status in which the encoding using the adjacent index I is suitable, so that the index I is changed. Due to this, the index I is changed at a proper timing on the basis of the number of MPSs which occur. Further, the encoding using the optimum index I can be adaptively accomplished.

Figure 7:
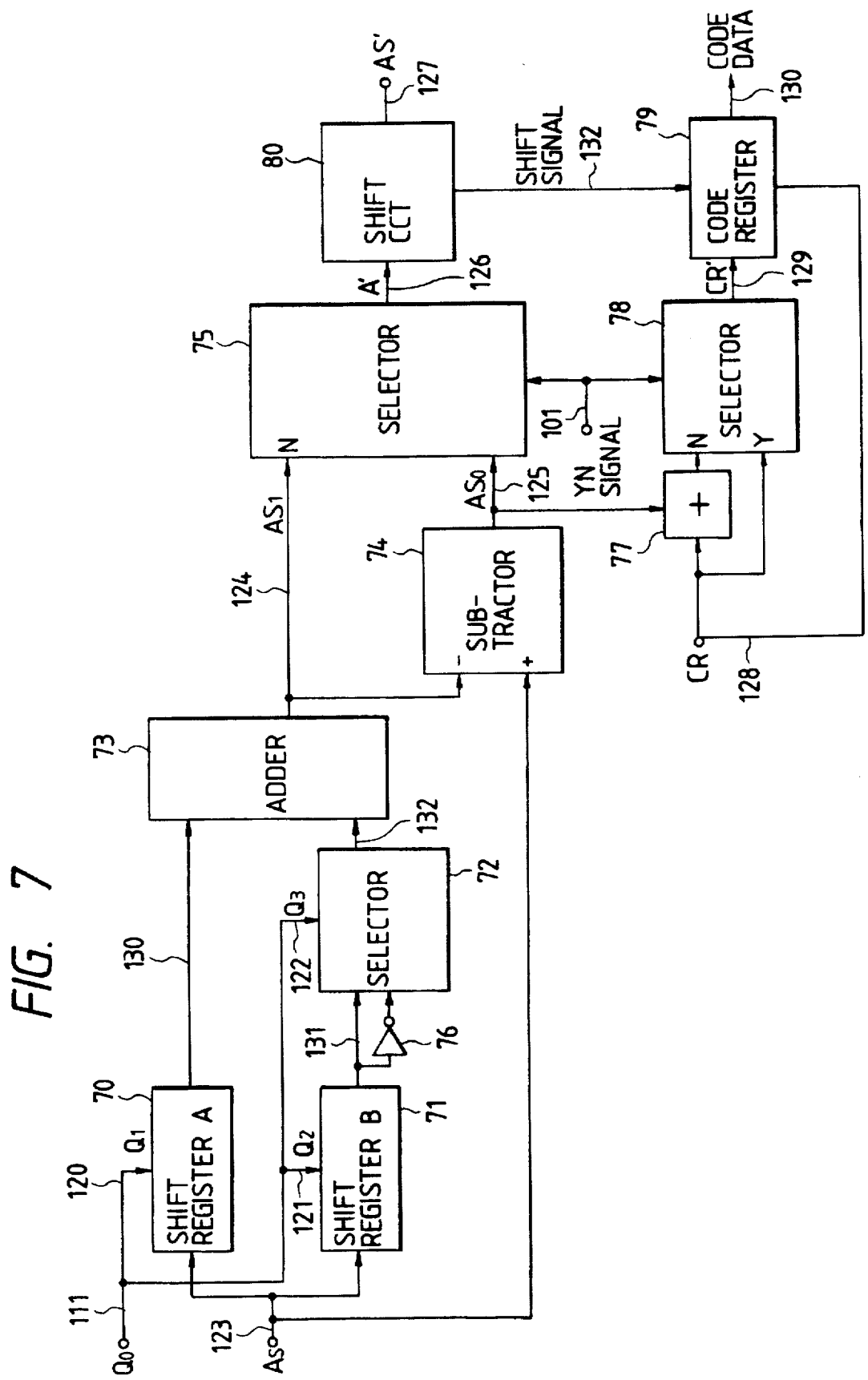
FIG. 7 is a block diagram of an arithmetic encoder.

FIG. 7 is a block diagram of the arithmetic encoder 18.

Among the control signals $Q_c$ 111 (Table 4) which were determined by the encoding parameter determination circuit 16, $Q_1$ is input to a shift register A 70, $Q_2$ is input to a shift register B 71, and $Q_3$ is input to a selector 72. $Q_1$ and $Q_2$ instruct the shift registers A and B with respect to by which number of bits an augend signal As 123 is shifted to the right, respectively. As the results of the shift, output signals 130 and 131 are obtained.

A complement of the signal 131 is obtained by an invertor 76. The selector 72 selects either the signal 131 or an output signal of the invertor 76 on the basis of the control signal $Q_3$ and obtains an output signal 132. An adder 73 adds the signal 130 from the shift register A 70 and the signal 132 from the selector 72 and outputs an $As_1$ signal 124. A subtractor 74 subtracts the $As_1$ signal 124 from the As signal 123 and obtains an $As_0$ signal 125. A selector 75 selects either the $As_0$ signal 125 or the $As_1$ signal 124 on the basis of the YN signal 101. That is, when the YN signal is set to "1", the $As_0$ signal is selected. When the YN signal is set to "0", the $As_1$ signal is selected. Thus, an A' signal 126 is output. A shift circuit 80 shifts the A' signal to the left until the MSB of the A' signal is set to "1". As the result of the shift, an As' signal 127 is derived. A shift signal 132 corresponding to the number of shifting operation times is input to a code register 79. The number of bits corresponding to the number of shifting operation times are sequentially output from the code register 79 in order starting from the MSB, so that code data 130 is derived.

The code data 130 is processed by a bit processing method (not shown) in a manner such that the number of continuous bits "1" is set within a limited number, and the processed data is sent to a receiver (not shown).

On the other hand, a content CR 128 of the code register 79 is added to the $As_0$ signal 125 by an adder 77. The resultant signal is input to a selector 78. The signal CR 128 which is not added to the $As_0$ signal 125 is also input to the selector 78. Thus, a CR' signal 129 which is set to CR'=CR when the YN signal 101 is set to "1" and which is set to CR'=CR+$As_0$ when YN="0" is output. The foregoing shifting process regarding the code register 79 is executed for the CR' signal.

The signal d 117 in the renewal circuit shown in FIG. 3 may be also fixed such that d=1. However, the tracing speed for changing the encoding parameters adequately can be also made further high as will be explained hereinlater.

Figure 8:
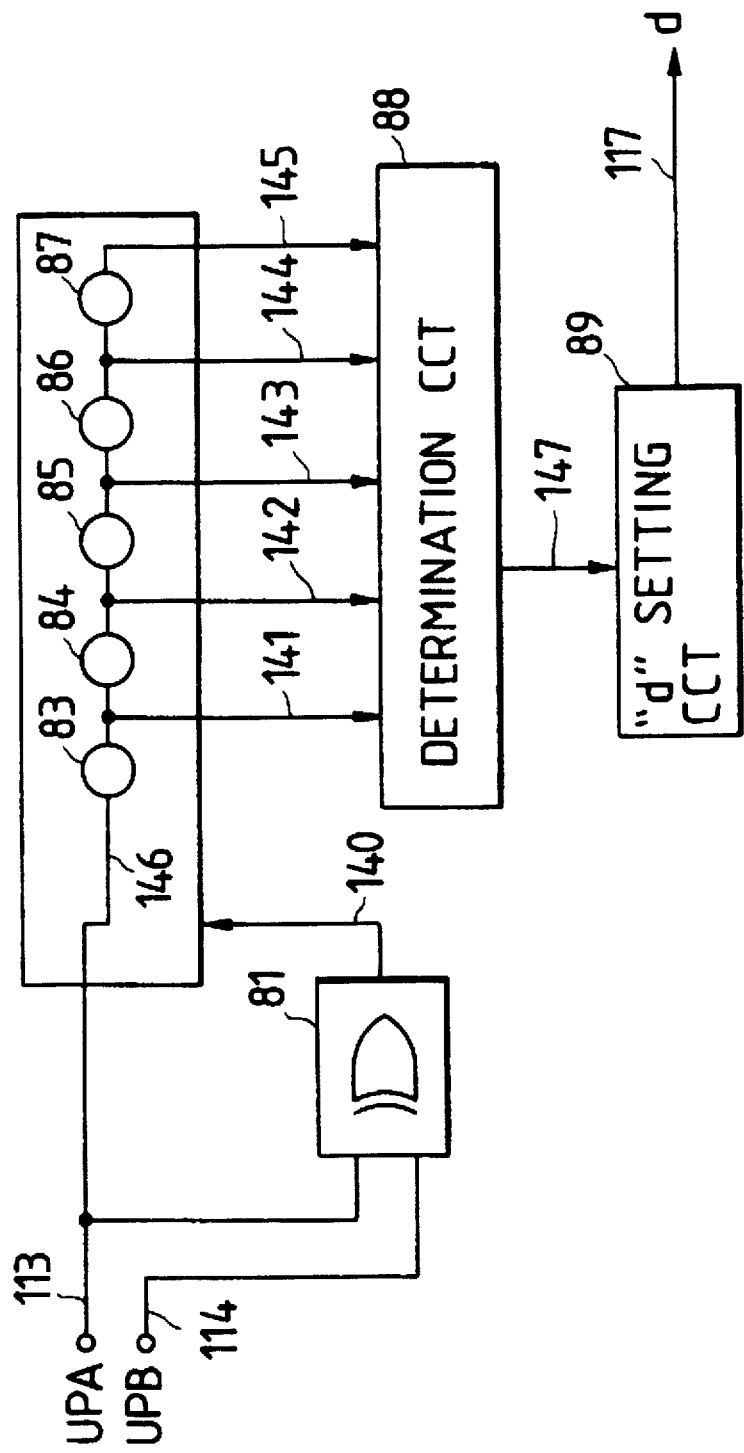
FIG. 8 is a block diagram of a determination circuit of d by an updating history.

FIG. 8 is a block diagram of the determination circuit of d.

When either one of the UPA and UPB signals has been set to "1", it is detected by an EX-OR circuit 81 and a detection signal 140 is output. When the output 140 is set to "1", latches 83 to 87 are driven so as to hold the histories of the past few times of the UPA and UPB signals. As shown in Table 5, when a signal 146 is set to "1", this means that the UPA signal has been set to "1". When the signal 146 is set to "0", this means that the UPB signal has been set to "1". Output signals 141 to 145 from the latches 83 to 87 are supplied to a determination circuit 88. A determination signal 147 indicating, for instance, whether all of the output signals 141 to 145 are set to "1" or "0" or not is output to a "d" setting circuit 89 from the determination circuit 88. The "d" setting circuit 89 outputs the d signal 117 which is set to d=2 when all of the output signals 141 to 145 are set to "1" or "0" and which is set to d=1 in the other cases. Thus, the tables shown in Table 3 can be switched.

As mentioned above, if the updating processes of the index continue, since the updating width of the index is set to a large value, the tracing of the index I according to the image can be promptly executed.

On the other hand, although the value of d has been set to a positive integer in the embodiment, the circuit can be also changed so as to obtain a value of d=½, ¼, or the like.

Although the appearance probability of the less probable symbol LPS has been approximated by the addition and subtraction of two terms of the power of 2, the number of terms is not limited to only two.

As described above, the index to determine the parameters for the arithmetic encoding can be updated at the optimum updating timing in accordance with the occurrence states of the most probable symbol and less probable symbol and the encoding which is adaptive to the input image can be preferably executed. Further, by changing the updating width by the updating history, it is possible to realize an image encoding system which can preferably trace the change in prediction coincidence probability after completion of the prediction conversion of the image.

Although the above embodiment has been described with respect to the encoding of the black/white binary image signal, an example of a construction in the case where the invention was applied to the encoding of a color image will now be described hereinbelow.

FIG. 9 is a diagram showing an embodiment of a color image transmission system to which the invention is applied. Input data 200 to 202 of RGB each consisting of one bit and indicative of each pixel of a color image are converted into a bit stream signal D 203 by a bit stream converter 30. For instance, as shown in Table 6, a bit stream signal which is used in the embodiment has a length of 1 to 7 bits for each color pixel of white, black, red, green, blue, cyan, magenta, and yellow in a manner such that the signal is set to "1" for white and is set to "01" for black. When the first bit (MSB) of the bit stream signal is set to "1", the color signal is determined to be white. On the contrary, when the MSB is set to "0", the color signal is determined to be a color other than white. In the case of a color other than white, the second bit is checked. If the second bit is set to "1", the color signal indicates black. When the second bit is set to "0", the color signal indicates a color other than black. By repeating the processes similar to the above, when the seventh bit (LSB) is set to "1", the color signal indicates magenta. When the LSB is set to "0", the color signal indicates yellow. A method of assigning the bits in the bit stream conversion is not limited to that shown in the table.

The bit stream signal D 203 which is output from the bit stream converter 30 is sent to an encoder 31. On the other hand, a Bt signal 204 indicating which number of bit of the bit stream signal has been output is output from the bit stream converter 30 to a status prediction circuit 33.

On the other hand, the input data 200 to 202 are stored into a line memory 32 having a capacity of a plurality of lines and are output as an output signal 205 together with the information of a few lines before to the status prediction circuit 33. In the status prediction circuit 33, the encoding status of each bit of the bit stream signal to be encoded is determined on the basis of the output signal from the line memory 32 and the Bt signal 204 and a status signal St 206 indicative of the encoding state is output.

The encoder 31 forms a code 207 by the encoding using a Markovian model code such as an arithmetic code on the basis of the bit stream signal D 203 and the status signal St 206 as will be explained hereinlater and transmits to a decoder 34.

The decoder 34 executes a decoding process to the transmitted code 207, so that a decoding bit stream signal D' 208 is formed. The signal D' 208 is reconverted into binary colors of R', G', and B' each consisting of one bit by an RGB converter 35. On the basis of the binary colors, a color image is displayed or recorded. It will be obviously understood from Table 6 that in the RGB converter 35, by counting the number of bits "0" subsequent to bit "1" of the signal D' 208, the color signals R', G', and B' which are indicated by the decoding bit stream signal D' 208 can be determined.

FIG. 10 is a block diagram of the bit stream converter 30. The input data 200 to 202 are converted every pixel into a 7-bit signal 212 shown in Table 6 on the basis of a table 36 such as an ROM or the like and input to a signal output unit 37. The signal output unit 37 has a shift register form. The 7-bit input signal 212 is input in parallel to the signal output unit 37 and serially output bit by bit in accordance with the order beginning from the MSB, so that the bit stream signal D 203 is obtained. When the stream signal is set to "1" or when seven bits "0" are output, the signal output unit 37 finishes the output of the color signals of one pixel and receives the next input data. On the other hand, the signal which Bt 204, which indicates number of the bit of the stream signal is at present being output, is output from the signal output unit 37.

As mentioned above, by bit stream converting and encoding the color image signal which is shown by the color component signals of each bit of R, G, and B, the encoding can be executed while preserving the color correlation without individually encoding R, G, and B having the correlation. On the other hand, when the encoding is executed while predicting the objective pixel such as in the arithmetic encoding, the prediction and encoding can be executed as color information without executing the prediction and encoding every component of R, G, and B. The encoding efficiency can be improved.

On the other hand, since each color component of R, G, and B indicative of the color of each pixel is expressed as one data, upon decoding, by decoding one data, the R, G, and B signals corresponding to each pixel can be obtained in a lump and the color image can be promptly regenerated.

Figure 11:
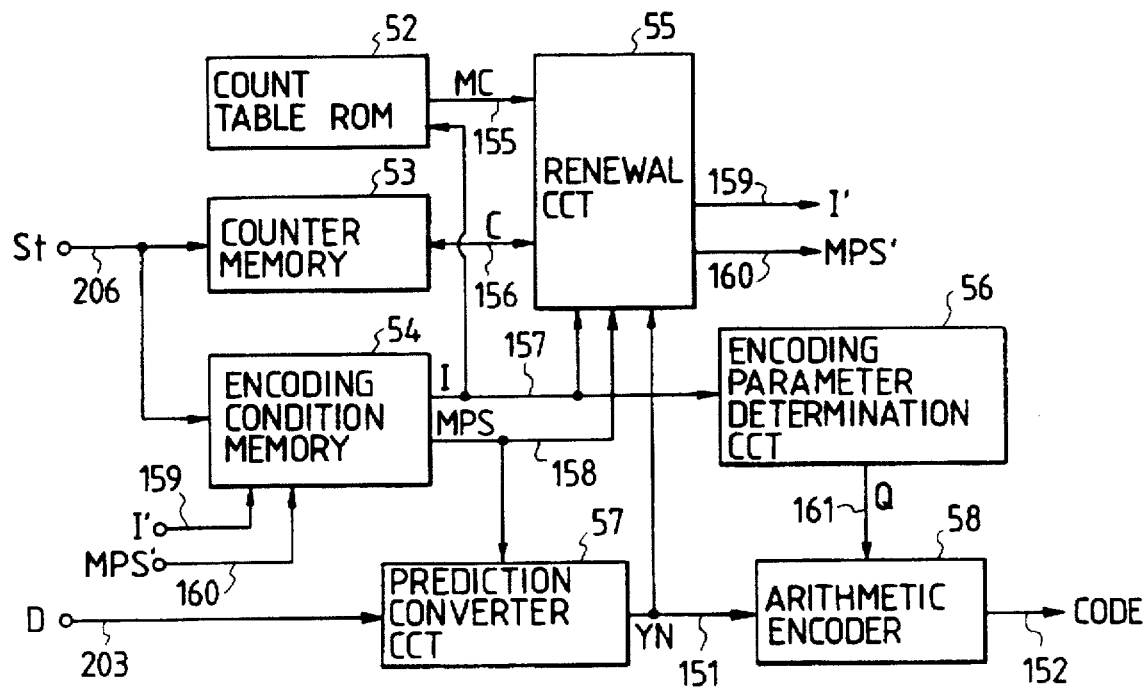
FIG. 11 is a block diagram of an encoder.

FIG. 11 is a block diagram of the encoder 31.

In the embodiment, the encoding is performed by using the arithmetic code.

In the arithmetic code, since the value of Q indicative of the appearance probability of the LPS can be switched every encoding data, the probability estimating section can be separated from the encoding section.

The embodiment uses a dynamic method of estimating the probability while executing the encoding.

A block diagram of the encoder 31 in FIG. 11 to execute the above arithmetic encoding will now be explained.

The status signal St 206 from the status prediction circuit 33 is input to a counter memory 53 and an encoding condition memory 54.

A most probable symbol MPS 158 as a symbol which is likely to appear and an index I 157 indicative of the encoding condition including the appearance probability of the LPS of the arithmetic code, which will be explained hereinlater, are stored into the encoding condition memory 54 every status which is expressed by the status signal St 206. The MPS 158 is input to a prediction converter circuit 57. The prediction converter circuit 57 forms a YN signal 151 which is set to "1" when the bit stream signal D 203 coincides with the MPS 158. The YN signal 151 is input to a renewal circuit 55. In the renewal circuit 55, when the YN signal is set to "1", the count value of the corresponding state among the count values stored in the counter memory 53 is increased. When a count value C 156 stored in the counter memory 53 coincides with a set value MC 155 from a count table ROM 52, the index I 157 is updated in an increasing direction (the direction so as to reduce the appearance probability q of the LPS). (The MPS is not inverted.)

The count table ROM 52 supplies to the renewal circuit 55 the number MC 155 of MPSs shown in Table 1 which has been predetermined in correspondence to the index I indicative of the appearance probability q of the LPS.

On the other hand, in the renewal circuit 55, when the MPS 158 and the pixel signal D 203 differ, that is, when the YN signal from the prediction converter circuit 57 is set to "0", the index I 157 is updated in a decreasing direction (the direction so as to increase the appearance probability q of the LPS). On the other hand, if the YN signal of "0" is input when the index I is set to "1", the MPS is inverted (0→1 or 1→0). Outputs I' 159 and MPS' 160 indicate values of the index after completion of the updating process and are again stored into the encoding condition memory 54.

An encoding parameter determination circuit 56 sets an encoding parameter Q 161 of the arithmetic code into an arithmetic encoder 58 on the basis of the value of the index I 157. In the arithmetic encoder 58, the YN signal 151 from the prediction converter circuit 57 is arithmetically encoded by using the parameter Q 161, thereby obtaining a code 152.

By previously giving an initial value to the encoding condition memory 54 and by preventing that the I and MPS from being updated, the static encoding can be easily realized.

Figure 12:
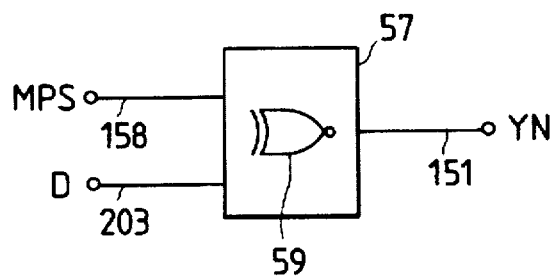
FIG. 12 is a block diagram of a prediction converter circuit.

FIG. 12 is a block diagram of the prediction converter circuit 57. The bit stream signal D 203 and MPS 158 are input to an EX-NOR circuit 59. In accordance with the logic equation of Table 2, the YN signal 151 which is set to "1" when the bit stream signal D 203 and MPS 158 coincide and which is set to "0" when they differ is output from the EX-NOR circuit 59.

Figure 13:
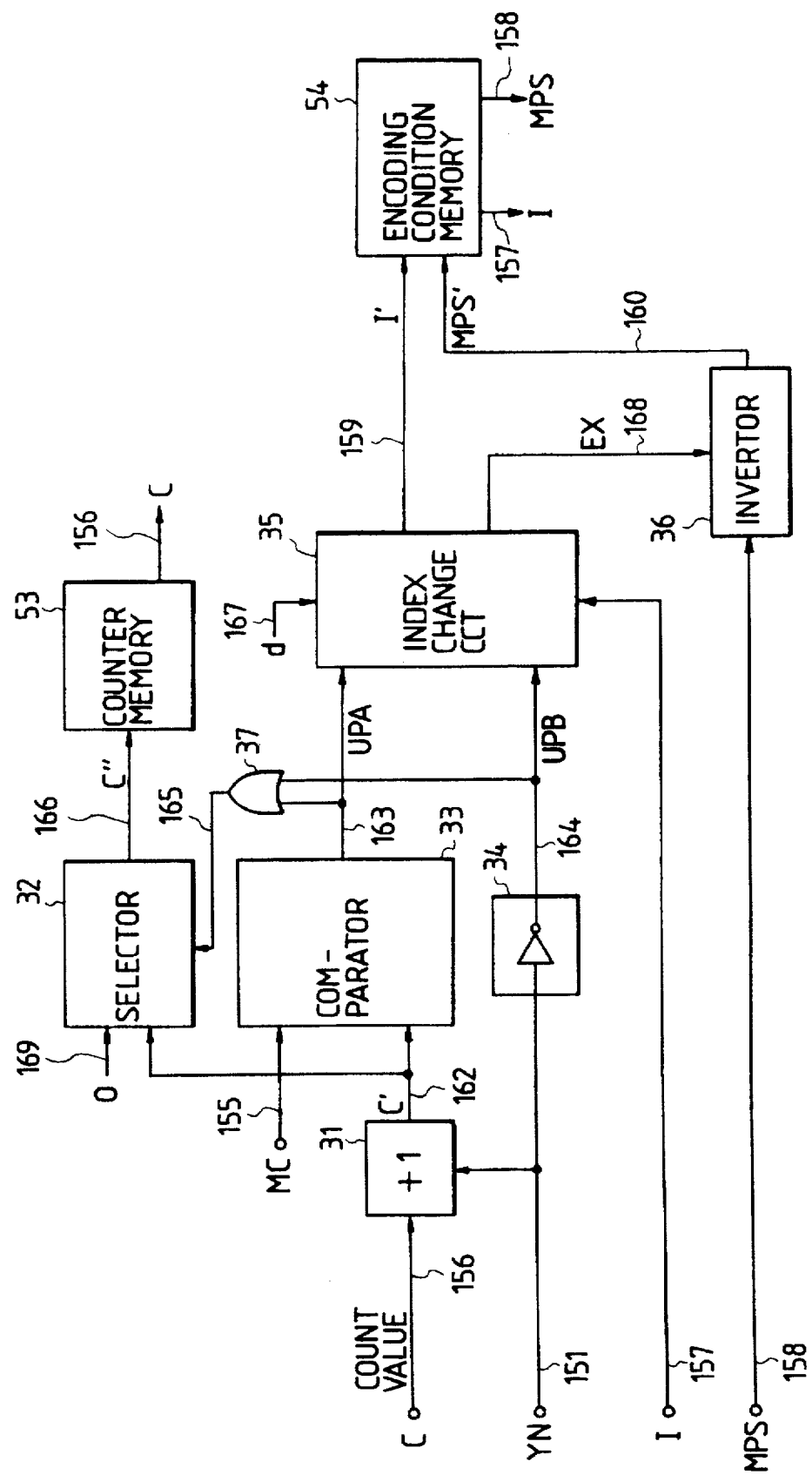
FIG. 13 is a block diagram of a renewal circuit.

FIG. 13 is a block diagram of the updating circuit 55. When the YN signal 151 is set to "1", the count value C 156 from the counter memory 53 is increased by "1" by an adder 31, so that a signal C' 162 is obtained. The value of C' is compared with the MC 155 from the count table ROM 52 by a comparator 33. When the value of C' coincides with the value of MC, an updating signal UPA 163 is set to "1". On the other hand, the YN signal 151 is transmitted through an invertor 34 and becomes an updating signal UPB 164. The updating signals UPA and UPB are input an index change circuit 35. The OR of the UPA and UPB is calculated by an OR circuit 37. An output signal 165 of the OR circuit 37 becomes a switching signal of a selector 32. When the signal 165 is set to "1", the selector 32 selects a "0" signal 169 to reset the value of the counter. In the other cases, the selector 32 selects the output signal C' 162 of the adder 31. The selected signal is output as a counter updating signal C" 166 and stored into the counter memory 53.

A signal d 167 (which has a standard value, d=1) to control the updating dividing level of the index, the updating signals UPA 163 and UPB 164, and the present index I 157 from the encoding condition memory 54 are input to the index change circuit 35.

Table 3 shows index updating methods in the index change circuit 35 (Table 3 shows the cases where the updating dividing level is set such that d=1 and d=2). The updated index I' is determined by referring to the table with respect to the input I, condition d, UPA, and UPB. On the other hand, when I=1 and UPB=1, an EX signal 168 is set to "1". When the EX signal is set to "1", an invertor 36 inverts the present MPS 158 (0→1 or 1→0), thereby obtaining the updated MPS' 160. On the other hand, when the EX signal is set to "0", the MPS' is not changed. The updated I' 159 and MPS' 160 are stored into the encoding condition memory 54 and are used as the index I and MPS for the next processings. The updating method shown in Table 3 can be also constructed by a table using an ROM or the like or can be also constructed by logic circuits using adders and subtractors.

As mentioned above, when the MPSs of the number which has been predetermined in accordance with the value of the index I indicative of the appearance probability q of the LPS which was approximated by the polynomial in powers of 2 occurred, the index I has d added thereto and the appearance probability q of the LPS which is used for the arithmetic code is reduced. On the other hand, when the LPS occurred, the index I has d subtracted therefrom and the appearance probability q of the LPS which is used for the arithmetic code is increased. On the other hand, further, if the LPS occurred in the state in which the index I in which the appearance probability q of the LPS indicates 0.5 is set to "1", the MPS is inverted.

As mentioned above, by updating the index and MPS so as to be adaptive to the input image, the arithmetic encoding of a high encoding efficiency can be accomplished.

Figure 14:
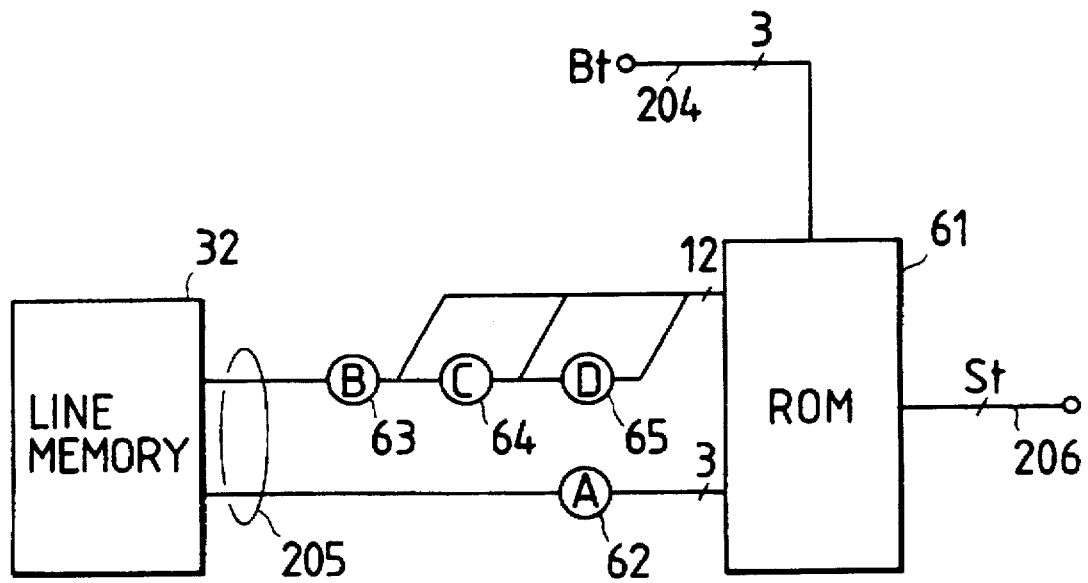
FIG. 14 is a block diagram of a status prediction circuit.
Figure 15:
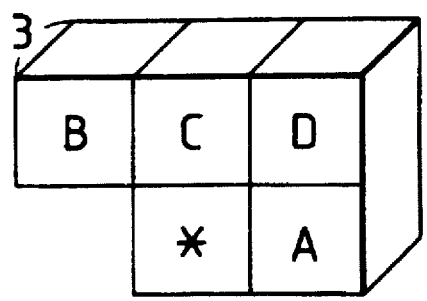
FIG. 15 is a diagram showing reference pixels.

FIG. 14 is a block diagram of the status prediction circuit 33. Four pixels A, B, C, and D shown in FIG. 15 are used as reference pixels to predict the status. Each of the reference pixels consists of three bits indicative of "1" or "0" of R, G, and B. * denotes a position of an objective pixel to be encoded. In FIG. 14, reference numerals 62, 63, 64, and 65 denote latches. The A latch 62 holds the 3-bit data of RGB of one pixel before the pixel to be encoded. As shown in FIG. 15, the B latch 63 holds the 3-bit data at the position which is one-pixel preceding to the objective pixel position of one line before. The C latch 64 holds the 3-bit data at the objective pixel position of one line before. The D latch 65 holds the 3-bit data at the position which is one-pixel after the objective pixel position of one line before. Those latch data are input to an ROM 61. The status signal St 206 is output from the ROM 61. The number of reference pixels is not limited to four.

That is, in the status prediction circuit 33, the color (either one of eight colors in Table 6) of the objective pixel is predicted on the basis of the latched data in the latches 62 to 65 and the status signal St 206 indicative of the status of each bit of the bit stream signal indicative of the predicted color is output.

Figure 16:
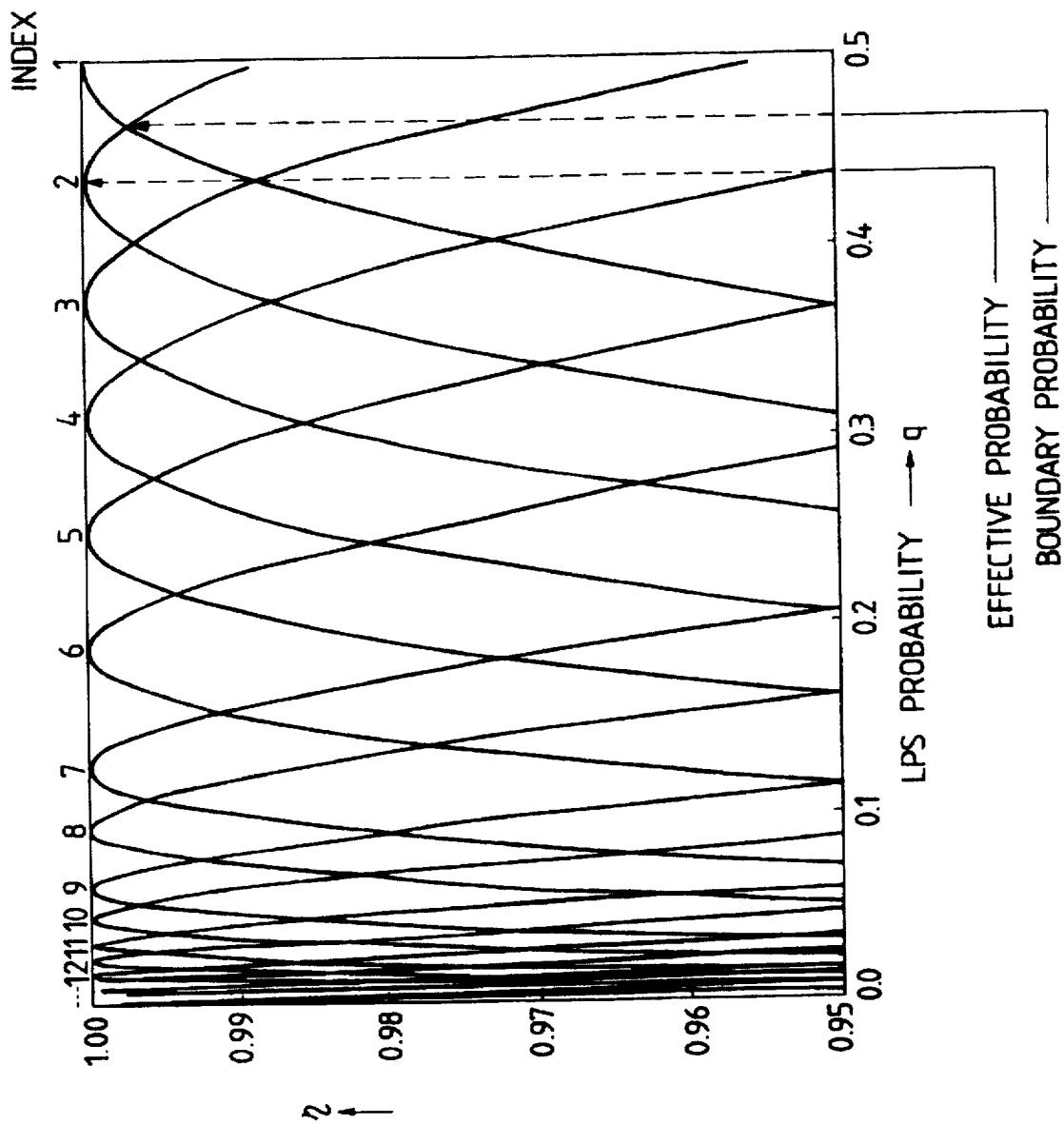
FIG. 16 is a diagram showing encoding efficiency curves.

FIG. 16 shows encoding efficiency curves of the arithmetic code which is used in the embodiment. The value of the index I will now be shown by a small letter i hereinbelow. The curve is shown by equation (14) when it is assumed that the appearance probability of LPS is set to q and the approximation probability upon encoding is set to $q_{ei}$. The index I is sequentially set to 1, 2, 3, . . . in accordance with the order from the large value of the appearance probability q of the LPS to the small value.

$$\eta = \frac{-q\log_2 q - (1-q)\log_2(1-q)}{-q\log_2 q_{ei} - (1-q)\log_2(1-q_{ei})} \quad (14)$$

where, a numerator indicates an entropy and $q_{ei}$ denotes a value shown by equation (15).

$$q_{ei} = q_1 + q_2 \quad (15)$$

$q_1$ and $q_2$ are set to values which are approximated by the polynomial of the power of 2 and are given by Table 5. For instance, those values are given by the following equations (16) to (18).

$$q_{e1}' = 2^{-1} \quad (16)$$

$$q_{e2}' = 2^{-1} - 2^{-4} \quad (17)$$

$$q_{e3}' = 2^{-2} + 2^{-3} \quad (18)$$

$q_{ei}$ at the peak point when the efficiency $\eta$ is set to 1.0 at the above probability is called an effective probability hereinafter. The intersection of the efficiency curve is called a boundary probability $q_{bi}$. It will be obviously understood that the efficiency can be improved by encoding by using the adjacent effective probabilities around the boundary probability as a turning point.

In the embodiment, as shown in equation (5), the effective probability $q_{ei}$ shown in Table 4 is selected from the probabilities which can be approximated by two terms. On the other hand, $Q_1$, $Q_2$, and $Q_3$ in Table 4 denote the parameters $Q_c$ 161 which are sent to the arithmetic encoder 58. That is, $Q_1$ and $Q_2$ denote the shift amounts which are given to the shift registers. The calculation of the power of 2 is executed by the shifting operation. $Q_3$ denotes the coefficient of the second term and is used to switch between (+) and (-).

The value of MC in Table 1 is determined in the following manner.

That is, assuming that the number of LPSs is set to $N_L$ and the number of MPSs is set to $N_M$, the appearance probability of the LPS is given by the following equation (19).

$$q = \frac{N_L}{N_M + N_L} \quad (19)$$

By solving equation (19) by $N_M$, equation (20) is obtained.

$$N_M = \lfloor N_L(1/q - 1) \rfloor \quad (20)$$

where, $\lfloor x \rfloor$ denotes that the figures below a decimal point are raised to a unit.

By giving $q_{bi}$ shown in FIG. 16 to q in the equation (20), the number $N_{Mi}$ of MPSs which exist there is calculated. Therefore, the value of MC is calculated from equation (21).

$$MC_i = N_{Mi+1} - N_{Mi} \quad (21)$$

The values of MC in Table 1 are obtained by the calculations based on equations (19), (20), and (21) on the assumption that $N_L = 2$.

As mentioned above, the number $N_{Mi}$ of MPSs corresponding to each index I is obtained on the basis of each boundary probability $q_{bi}$ as shown in FIG. 16. The difference between the numbers $N_M$ of MPSs of the adjacent indices is set to MC for each index I.

The value of MC is compared with the number of MPSs which occur as mentioned above. If the value of MC and the number of MPSs coincide, the state is decided to be the state in which the encoding using the adjacent index I is suitable, so that the index I is changed. Thus, the index I is changed at a proper timing on the basis of the number of MPSs which occur and the encoding using the optimum index I can be adaptively accomplished.

Figure 17:
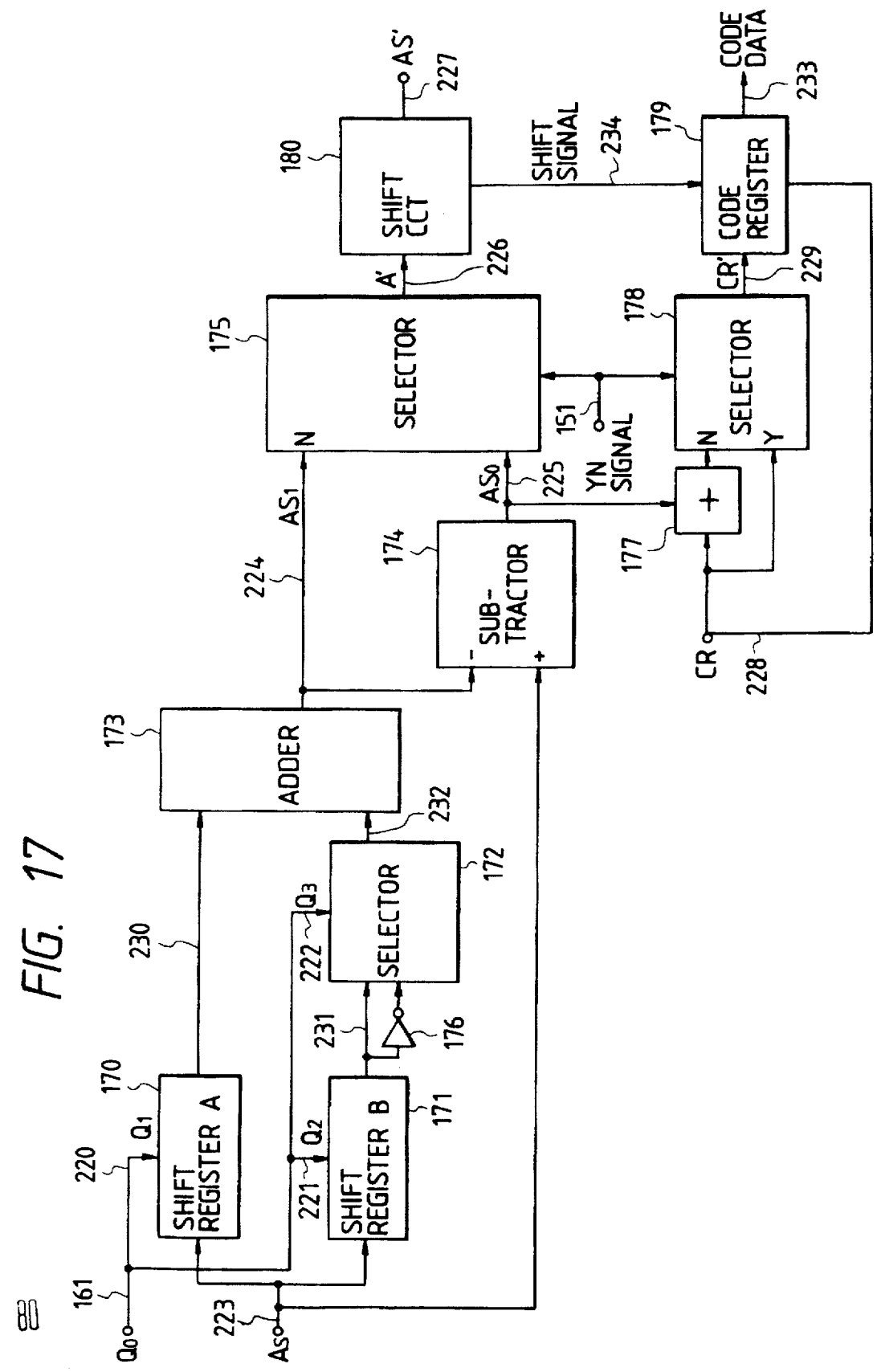
FIG. 17 is a block diagram of an arithmetic encoder.

FIG. 17 is a block diagram of the arithmetic encoder 58. Among the control signals $Q_0$ 161 (Table 4) which were determined by the encoding parameter determination circuit 56, $Q_1$ is input to a shift register A 170, $Q_2$ is input to a shift register B 171, and $Q_3$ is input to a selector 172. $Q_1$ and $Q_2$ instruct to the shift registers A and B that by how many bits an augend signal As 223 is shifted to the right, respectively. Signals 230 and 231 are output as the results of the shifting operation.

A complement of the signal 231 is obtained by an inverter 176. On the basis of the control signal $Q_3$, the selector 172 selects the signal 231 or an output signal of the invertor 176, thereby obtaining an output signal 232. An adder 173 adds the signal 230 from the shift register A 170 and the signal 232 from the selector 172 and outputs an $As_1$ signal 224. A subtractor 174 subtracts the $As_1$ signal 224 from the As signal 223 and obtains an $As_0$ signal 225. A selector 175 selects either the $As_0$ signal 225 or the $As_1$ signal 224 on the basis of the YN signal 151. That is, when the YN signal is set to "1", the $As_0$ signal is selected. When the YN signal is set to "0", the $As_1$ signal is selected. The selected signal is used as an A' signal 226. A shift circuit 180 shifts the A' signal to the left until the MSB of the A' signal is set to "1". By the shifting operation, an As' signal 227 is obtained. A shift signal 234 corresponding to the number of shifting operation times is input to a code register 179. The number of bits corresponding to the shifting operation times are sequentially output from the code register 179 in outer beginning from the MSB, so that encoding data 233 is obtained.

The encoding data 233 is processed by a bit processing method (not shown) in a manner such that the number of continuous bits "1" is set to a value within a limit value. The processed data is transmitted to the decoder 34.

A content CR 228 of the code register 179 is added to the $As_0$ signal 225 by an adder 177 and the addition signal is input to a selector 178. On the other hand, the signal CR 228 which is not added to the $As_0$ signal 225 is also input to the selector 178. A signal CR' 229 which is set to CR'=CR when the YN signal 151 is set to "1" and which is set to CR'=CR+$As_0$ when the YN signal 151 is set to "0" is output from the selector 178. The shifting process mentioned above with regard to the code register 179 is executed for the CR' signal 229.

Although the embodiment shown in FIG. 9 has been described with respect to the encoding of a color image, the embodiment has a feature which makes it highly compatible with a system for encoding only a black and white binary image signal. That is, information of black and white binary values (white when "1"; color other than white, that is, black when "0") can be encoded by using only one bit of MSB of the bit stream signal shown in Table 6.

Figure 18:
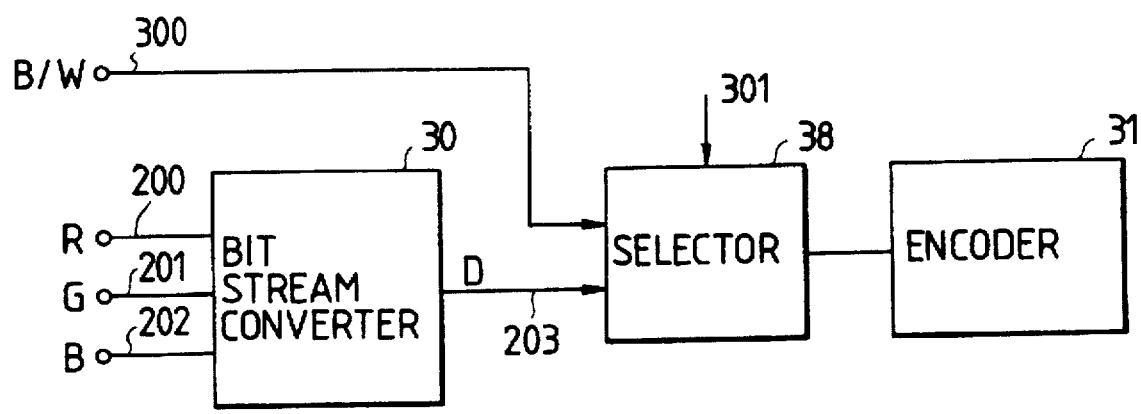
FIG. 18 is a block diagram of a switching mechanism.

FIG. 18 is a block diagram showing a construction which is added to the construction of FIG. 9 in order to switch between a black/white binary signal and a binary color signal. A B/W signal 300 and the bit stream signal D 203 are switched by a selector 38 on the basis of a switching signal 301 from a controller (not shown).

Figure 19:
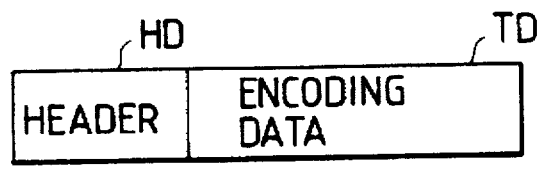
FIG. 19 is a diagram showing an example of transmission data.

ID information to discriminate whether the signal is a B/W binary signal or a binary color signal is sent to the decoding side by header data HD as a head of transmission data TD as shown in FIG. 19, thereby switching the decoding process.

On the other hand, if the average appearance probability of each color is known to a certain extent as shown in Table 7, even if the bit stream converted signal shown in Table 6 is sent without being further encoded or even if the bit stream converted signal is subjected to other encoding process such as a run length encoding or the like instead of the foregoing arithmetic code and is sent, the easy encoding can be executed.

As described above, according to the invention, by bit stream converting the binary color signal, efficient encoding using the color correlation can be performed. An increase in information amount can be prevented thereby. Further, by encoding the bit stream signal by using the dynamic arithmetic code, the binary color image can be efficiently encoded.

Although the present invention has been described with respect to the preferred embodiment, the invention is not limited to the foregoing embodiment but many modifications and variations are possible within the spirit and scope of the appended claims of the invention.

TABLE 1

| I  | MC  |
|----|-----|
| 1  | 2   |
| 2  | 1   |
| 3  | 1   |
| 4  | 1   |
| 5  | 2   |
| 6  | 4   |
| 7  | 5   |
| 8  | 8   |
| 9  | 11  |
| 10 | 15  |
| 11 | 22  |
| 12 | 30  |
| 13 | 43  |
| 14 | 61  |
| 15 | 87  |
| 16 | 120 |
| 17 | 174 |
| 18 | 241 |
| 19 | 348 |
| 20 | 483 |

TABLE 2

| Image signal | MPS | YN |
|---|---|---|
| 0 | 0 | 1 |
| 0 | 1 | 0 |
| 1 | 0 | 0 |
| 1 | 1 | 1 |

TABLE 3

| | UPA = UPB = 0 | d = 1 UPA = 1 | UPB = 1 | | d = 2 UPA = 1 | UPB = 1 | |
|---|---|---|---|---|---|---|---|
| I | r | r | r | EX | r | r | EX |
| 1  | 1  | 2  | 1  | 1 | 3  | 1  | 1 |
| 2  | 2  | 3  | 1  | 0 | —  | —  | — |
| 3  | 3  | 4  | 2  | 0 | 5  | 1  | 0 |
| 4  | 4  | 5  | 3  | 0 | —  | —  | — |
| 5  | 5  | 6  | 4  | 0 | 7  | 3  | 0 |
| 6  | 6  | 7  | 5  | 0 | —  | —  | — |
| 7  | 7  | 8  | 6  | 0 | 9  | 5  | 0 |
| 8  | 8  | 9  | 7  | 0 | —  | —  | — |
| 9  | 9  | 10 | 8  | 0 | 11 | 7  | 0 |
| 10 | 10 | 11 | 9  | 0 | —  | —  | — |
| 11 | 11 | 12 | 10 | 0 | 13 | 9  | 0 |
| 12 | 12 | 13 | 11 | 0 | —  | —  | — |
| 13 | 13 | 14 | 12 | 0 | 15 | 11 | 0 |
| 14 | 14 | 15 | 13 | 0 | —  | —  | — |
| 15 | 15 | 16 | 14 | 0 | 17 | 13 | 0 |
| 16 | 16 | 17 | 15 | 0 | —  | —  | — |
| 17 | 17 | 18 | 16 | 0 | 19 | 15 | 0 |
| 18 | 18 | 19 | 17 | 0 | —  | —  | — |
| 19 | 19 | 20 | 18 | 0 | 21 | 17 | 0 |
| 20 | 20 | 21 | 19 | 0 | —  | —  | — |
| 21 | 21 | 21 | 20 | 0 | 21 | 19 | 0 |

(—): don't care

TABLE 4

| I | Effective Probability $q_e$ | Coefficient $q_1$ | Coefficient $q_2$ | Encoding parameter $Q_1$ | Encoding parameter $Q_2$ | Encoding parameter $Q_3$ |
|---|---|---|---|---|---|---|
| 1 | 0.5000 | $2^{-2}$ | $2^{-2}$ | 2 | 2 | + |
| 2 | 0.4375 | $2^{-1}$ | $-2^{-4}$ | -1 | 4 | - |
| 3 | 0.3750 | $2^{-2}$ | $2^{-3}$ | 2 | 3 | + |
| 4 | 0.3125 | $2^{-2}$ | $2^{-4}$ | 2 | 4 | + |
| 5 | 0.2500 | $2^{-3}$ | $2^{-3}$ | 3 | 3 | + |
| 6 | 0.1875 | $2^{-3}$ | $2^{-4}$ | 3 | 4 | + |
| 7 | 0.1250 | $2^{-4}$ | $2^{-4}$ | 4 | 4 | + |
| 8 | 0.0938 | $2^{-4}$ | $2^{-5}$ | 4 | 5 | + |
| 9 | 0.0625 | $2^{-5}$ | $2^{-6}$ | 5 | 5 | + |
| 10 | 0.0469 | $2^{-5}$ | $2^{-6}$ | 5 | 6 | + |
| 11 | 0.0313 | $2^{-6}$ | $2^{-6}$ | 6 | 6 | + |
| 12 | 0.0234 | $2^{-6}$ | $2^{-7}$ | 6 | 7 | + |
| 13 | 0.0156 | $2^{-7}$ | $2^{-7}$ | 7 | 7 | + |
| 14 | 0.0117 | $2^{-7}$ | $2^{-8}$ | 7 | 8 | + |
| 15 | 0.0078 | $2^{-8}$ | $2^{-8}$ | 8 | 8 | + |
| 16 | 0.0059 | $2^{-8}$ | $2^{-9}$ | 8 | 9 | + |
| 17 | 0.0039 | $2^{-9}$ | $2^{-9}$ | 9 | 9 | + |
| 18 | 0.0029 | $2^{-9}$ | $2^{-10}$ | 9 | 10 | + |
| 19 | 0.0020 | $2^{-10}$ | $2^{-10}$ | 10 | 10 | + |
| 20 | 0.0015 | $2^{-10}$ | $2^{-11}$ | 10 | 11 | + |
| 21 | 0.0010 | $2^{-11}$ | $2^{-11}$ | 11 | 11 | + |

TABLE 5

| UPA | UPB | 146 |
|---|---|---|
| 0 | 0 | — |
| 1 | 0 | 1 |
| 0 | 1 | 0 |
| 1 | 1 | — |

(—): don't care

TABLE 6

| Color | R | G | B | Bit stream signal MSB | | | | | | LSB | Length of 0 |
|---|---|---|---|---|---|---|---|---|---|---|---|
| White | 1 | 1 | 1 | 1 | — | — | — | — | — | — | 0 |
| Black | 0 | 0 | 0 | 0 | 1 | — | — | — | — | — | 1 |
| Red | 1 | 0 | 0 | 0 | 0 | 1 | — | — | — | — | 2 |
| Green | 0 | 1 | 0 | 0 | 0 | 0 | 1 | — | — | — | 3 |
| Blue | 0 | 0 | 1 | 0 | 0 | 0 | 0 | 1 | — | — | 4 |
| Cyan | 0 | 1 | 1 | 0 | 0 | 0 | 0 | 0 | 1 | — | 5 |
| Magenta | 1 | 0 | 1 | 0 | 0 | 0 | 0 | 0 | 0 | 1 | 6 |
| Yellow | 1 | 1 | 0 | 0 | 0 | 0 | 0 | 0 | 0 | 0 | 7 |

TABLE 7

| Color | Code length | Probability |
|---|---|---|
| White | 1 | 0.5 |
| Black | 2 | 0.25 |
| Red | 3 | 0.25/6 |
| Green | 4 | 0.25/6 |
| Blue | 5 | 0.25/6 |
| Cyan | 6 | 0.25/6 |
| Magenta | 7 | 0.25/6 |
| Yellow | 7 | 0.25/6 |

Average code length: 1.25

We claim:

1. An image encoding method comprising:

a first inputting step of inputting a plurality of bits of signals representing a color of each of a plurality of pixels in a color image;

a second inputting step of inputting a binary signal representing whether each of a plurality of pixels in a monochromatic image is black or white;

a converting step of converting the plurality of bits of signals into a bit stream signal representing a color of each of a plurality of pixels in the color image;

a third inputting step of inputting a switching signal;

a selecting step of selecting one of the bit stream signal and the binary signal on the basis of the switching signal;

a compressing step of compressing the selected signal by a prediction encoding; and an adding step of adding, to the compressed signal, identification data representing a result of the selection.

2. A method according to claim 1, wherein the bit stream signal has a length dependent on a color of pixel represented by the plurality of bits of signals.

3. A method according to claim 2, wherein the bit stream signal comprises bits of logic "0" and/or logic "1", and a number of bits of logic "0" in the bit stream signal is different for each color.

4. A method according to claim 1, wherein in said compressing step, the selected signal is compressed by an arithmetic code as the prediction encoding.

5. A method according to claim 1, wherein in said compressing step, a parameter for the prediction encoding is changed in accordance with a color represented by the selected signal.

6. A method according to claim 1, wherein in said compressing step, the prediction encoding is adaptively executed.

7. A method according to claim 1, wherein the plurality of bits of signals represent one of white, black, red, green, blue, cyan magenta and yellow.

8. An image encoding apparatus comprising:

first inputting means for inputting a plurality of bits of signals representing a color of each of a plurality of pixels in a color image;

second inputting means for inputting a binary signal representing whether each of a plurality of pixels in a monochromatic image is black or white;

converting means for converting the plurality of bits of signals into a bit stream signal representing a color of each of a plurality of pixels in the color image;

third inputting means for inputting a switching signal;

selecting means for selecting one of the bit stream signal and the binary signal on the basis of the switching signal;

compressing means for compressing the selected signal by a prediction encoding; and adding means for adding, to the compressed signal, identification data representing a result of the selection.

9. An apparatus according to claim 8, wherein the bit stream signal has a length dependent on a color of pixel represented by the plurality of bits of signals.

10. An apparatus according to claim 9, wherein the bit stream signal comprises bits of logic "0" and/or logic "1", and a number of bits of logic "0" in the bit stream signal is different for each color.

11. An apparatus according to claim 8, wherein said compressing means compresses the selected signal by an arithmetic code as the prediction encoding.

12. An apparatus according to claim 8, wherein said compressing means compresses the selected signal in accordance with a parameter associated with a color represented by the selected signal.

13. An apparatus according to claim 8, wherein the plurality of bits of signals represent one of white, black, red, green, blue, cyan, magenta and yellow.

* * * * *

UNITED STATES PATENT AND TRADEMARK OFFICE
CERTIFICATE OF CORRECTION

PATENT NO. : 5,710,826

DATED : January 20, 1998

INVENTOR(S): HIDEFUMI OSAWA ET AL.

It is certified that error appears in the above-identified patent and that said Letters Patent is hereby corrected as shown below:

On the title page, item

[56] REFERENCES CITED

Other Publications
        "Block-White" should read --Black-White--.

COLUMN 1

Line 17, "(international" should read --(International--.
    Line 30, "such an" should read --the--.

COLUMN 4

Line 53, "0R" should read --OR--.

COLUMN 6

Line 62, "to by which" should read --to which--.
    Line 66, "invertor" should read --inverter--.

COLUMN 7

Line 1, "invertor" should read --inverter--.

COLUMN 9

Line 10, "which" should be deleted.

COLUMN 12

Line 58, "invertor" should read --inverter--.

UNITED STATES PATENT AND TRADEMARK OFFICE
CERTIFICATE OF CORRECTION

PATENT NO. : 5,710,826

DATED : January 20, 1998

INVENTOR(S) : HIDEFUMI OSAWA ET AL.

It is certified that error appears in the above-identified patent and that said Letters Patent is hereby corrected as shown below:

<u>COLUMN 15</u>

Line 14, "$2^{-6}$" should read --$2^{-5}$--.

<u>COLUMN 16</u>

Line 40, "represent" should read --represents--.
Line 41, "cyan" should read --cyan,--.

<u>COLUMN 18</u>

Line 4, "represent" should read --represents--.

Signed and Sealed this

Eighteenth Day of August, 1998

*Attest:*

BRUCE LEHMAN

*Attesting Officer*   *Commissioner of Patents and Trademarks*